UNITED STATES PATENT OFFICE.

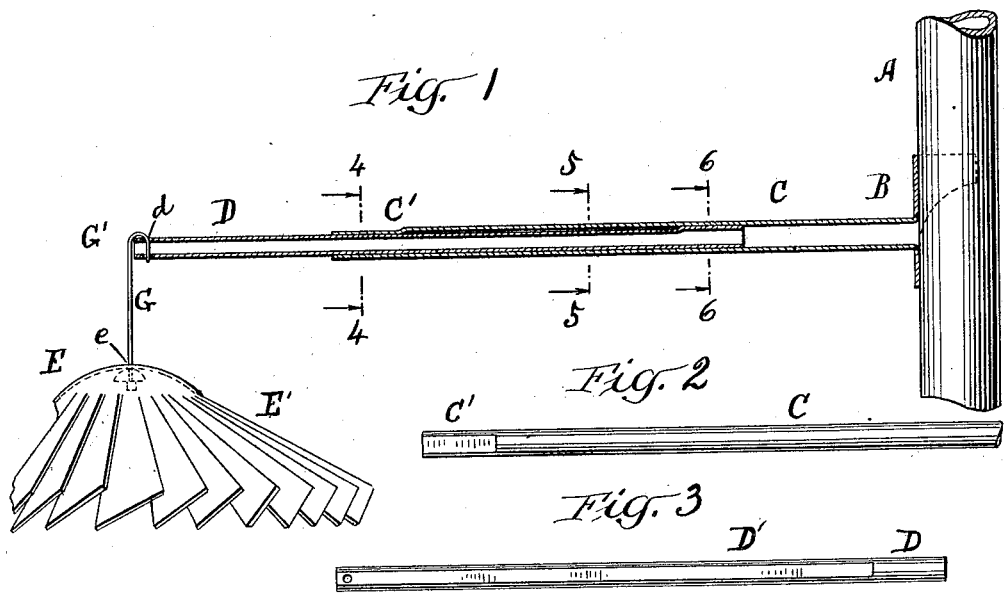
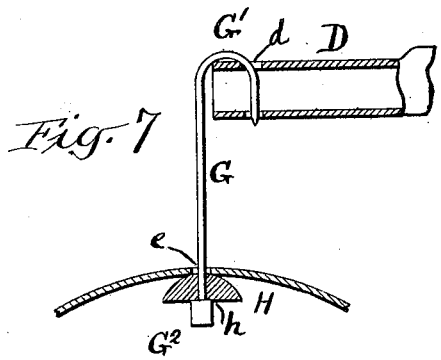

JOHN D. KANTRO, OF NEW YORK, N. Y.

BELL FOR GAS-LIGHTS.

1,102,592.  Specification of Letters Patent.  Patented July 7, 1914.

Application filed November 25, 1912. Serial No. 733,309.

*To all whom it may concern:*

Be it known that I, JOHN D. KANTRO, a citizen of the United States, residing in Brooklyn, in the city of New York and State of New York, have invented a certain new and useful Improvement Relating to Bells for Gas-Lights; and I do hereby declare the following a full and exact description thereof.

I designate as a bell the screen of thin metal sometimes interposed between a jet of gas and the ceiling above I have devised a construction which allows and fulfils all the conditions. I may term it a screw bell.

My bell may be of any form preferred except that it shall be cut radially from the periphery inward some two-thirds of the distance toward the center. If the blades are set quite inclined the screw turns certainly but slowly. If they are set too flat the screw turns rapidly but not certainly,—and adverse conditions, especially a too small flame, induces a stop and in some cases it will not start again. The resistance from friction depends much on the diameter of the bearing. If the latter is very small the friction is slight but as ordinarily supported, the strength may not be sufficient to endure when the strain is oblique or variable or both.

I provide by a ring which I will term a "washer" for maintaining only a delicate and truly vertical load on the support unaffected by distributing conditions.

I will describe the invention as applied to a bracket light.

I hang the washer to an arm capable of being elongated at will; the provision by which the slight weight of the bell is supported on the arm allows it to be rocked in every direction and maintains a firm and so nearly frictionless support that it is revolved by the gentle upward current of air and spent gases from the flame below even if the gas is turned low. My experiments indicate that the effect is to so mix and agitate the air that there is no smoking of the ceiling.

Good practice heretofore has tried to have the blades set flat enough to revolve well with a strong flame and allow the revolution to stop when but little gas is used. Those in the business know that the result of such stopping ruins delicate and expensive decorations of ceilings. My device on the contrary preserves such indefinitely.

The following is a description of what I consider the best means of carrying out the invention.

The accompanying drawings form a part of this specification.

Figure 1 is a longitudinal vertical section, parts being in side elevation. Fig. 2 is a plan view of the outer arm, which I may sometimes refer to as the main arm, and Fig. 3 a side view of the slide which is mounted within the main arm and is capable of being moved longitudinally by a strong force of the hand. The remaining figures are on a larger scale. Fig. 4 is a cross section on the line 4—4 in Fig. 1. Fig. 5 is a cross section on the line 5—5 in Fig. 1. Fig. 6 is a cross section on the line 6—6 in Fig. 1. Fig. 7 is a longitudinal central section of a portion corresponding to Fig. 1, and Fig. 8 is a perspective view of what I term the washer inverted.

Similar letters of reference indicate corresponding parts in all the figures where they appear.

A spring clip B takes hold of the gas pipe A and a hollow arm C is rigidly attached to B extending horizontally. The outer end of C is flattened on its upper side as shown at C'. A sliding arm D of less diameter has all but its inner end similarly flattened on its upper side D', the flattened portion constituting the main part of its length. This arm D is inclosed and may be shifted in and out to adjust it. Its motion is resisted by so much friction as to hold it reliably in any place where it may be set. The outer end of the arm D has a small hole $d$ in its flat upper side D'.

E is the bell formed with blades E' twisted uniformly. A liberal hole $e$ in its center receives a suspending head $G^2$ with liberty to incline to great extent when required in adjusting, or in being exposed at times to high winds or other disturbing influences.

H is what I will term a washer which should be made of suitable material as steel adapted to endure heat and particularly to make little resistance by friction.

The lower end of the suspending rod or wire G is formed with a smooth head $G^2$ which is slightly coned and of small diameter. The hole $h$ in washer H is bored to make its bearing close to the center of motion,—a circle of small diameter, and with the light weight of the bell making a very slight frictional resistance. The upper end of the suspending wire is formed into a hook G' which can be readily engaged in the hole $d$ and disengaged therefrom at will.

The construction of the bearing $G^2$ (H) is an important factor in reducing the resistance due to friction therein and to insure the easy and rapid revolution of the bell. It is to be noted that the bell E turns on the curved surface of the washer H independently of the revolution of said washer.

The hollow arm or tube C being set roughly level the inclosed arm D should be moved forcibly outward or inward in its gentle frictional embrace until the bell is centrally over the gas jet; it may then remain there indefinitely.

Whenever the gas is lighted the upward flow of the gaseous products of combustion and of air turns the bell in the obvious manner. The washer H revolves always with the bell. The liberal size of the hole $e$ allows the parts to rock without any straining of the delicate mounting below. The bearing on the small annulus at the center, the only surface which has any revolving friction is of such small diameter and the surfaces are so smooth that the bell is rapidly turned by the upward current of gases even when the jet is only partly turned on.

So far I have assumed that the arm is fixed by any convenient means. Fig. 1 shows an additional feature which allows for turning and for shifting up and down which latter may frequently be desired. The clip B can be sprung together or spread open to match different sizes of the gas pipe.

My construction has few parts and the whole is simple. The parts may be easily separated and stored close. The hook G' on the upper end of the suspension rod G can be not only disengaged from the sliding arm D but it can by severely inclining it be disengaged from the bell. The slide is separable from the hollow main arm C when required by first detaching the clip B from the gas pipe and then sliding the arm D inward. The spring clip B holds the compound arm stiffly against any lateral swinging. The whole will maintain its position against the vibrations due to the revolution, or wind or other disturbing agencies.

This construction solves the difficult problem of a cheap and easily operated suspension for a revolving gas bell and one so nearly frictionless that it will turn with a small use of gas. It revolves so nearly frictionless that it maintains a high rate of speed and prevents the volume of smoke from reaching the ceiling.

I have in my experiments used aluminum for the bell. I prefer this for its lightness and stiffness. Brass may be used.

I attach much importance to the fact that the parts will stay together in all ordinary handling and irregular motions. The slide is retained within the hollow arm by the locking provided by the flat places. So long as the arm is not drawn out beyond the limit, it moves, resisted only by the friction, which can be increased at will by slightly bending the arm A and C in opposite directions if desired; but in all that movement the flat part of the inner arm D is sliding within the flat part near the outer end C' of the outer arm or pipe C. But when the full limit of its proper drawing out is reached, the round inner end of the arm D is stopped by the flat part of C and it cannot go farther out.

Modifications may be made.

I claim as my invention:—

1. A gas bell having screw wings thereon and an aperture in its top, a supporting rod for the bell extending loosely through such aperture, the rod being provided with a head having a bearing surface thereon, a plano-convex washer resting on the bearing surface of the head and provided with a hole through which the supporting rod is passed, the concaved surface of the bell and the aperture therein allowing the bell to rotate freely and to be inclined during its rotation on the convex surface of the washer.

2. A gas bell having screw wings, and an aperture in its top, a suspension rod passed loosely through said aperture, a washer carried by said rod and having a convex surface on which said bell is supported, means for retaining said washer upon the rod, said bell being freely rotatable and also free to be inclined during its rotation, and means for sustaining said rod.

Signed at New York city, in the county of New York and State of New York this 23d day of November, A. D. 1912.

JOHN D. KANTRO.

Witnesses:
 THOMAS DREW STETSON,
 L. G. GITLIN.

---

Copies of this patent may be obtained for five cents each, by addressing the "Commissioner of Patents, Washington, D. C."